United States Patent
Eslambolchi et al.

(10) Patent No.: US 6,373,252 B1
(45) Date of Patent: Apr. 16, 2002

(54) METHOD AND APPARATUS LOCATING A CABLE IN A PIPE

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/562,222

(22) Filed: Apr. 28, 2000

(51) Int. Cl.[7] .......................... G01R 19/00; G01V 3/08; G01V 3/10
(52) U.S. Cl. .......................... 324/326; 324/67
(58) Field of Search .......................... 324/66, 67, 326, 324/228, 232, 327, 329, 539, 541, 543, 544

(56) References Cited

U.S. PATENT DOCUMENTS

| | | | |
|---|---|---|---|
| 3,617,865 A | * 11/1971 | Hakata | 324/258 |
| 5,194,812 A | * 3/1993 | Yokoi | 324/326 |
| 5,640,092 A | * 6/1997 | Motazed et al. | 324/247 |
| 5,644,237 A | 7/1997 | Eslambolchi et al. | 324/326 |
| 5,920,194 A | * 7/1999 | Lewis et al. | 324/326 |

* cited by examiner

Primary Examiner—Jay Patidar
(74) Attorney, Agent, or Firm—Robert B. Levy

(57) ABSTRACT

The relative position of a cable (10) within a pipe (16) is obtained by first applying a locating signal to a metallic part (12) of the cable so that the locating signal radiates beyond the pipe. The strength of the locating signal is measured at two separate distances from the cable via a pair of signal detectors (24, 26). By comparing the difference in the locating signal strengths to a predicted differential locating signal strength for a given cable depth within a pipe of known parameters, the actual cable depth can be detected.

11 Claims, 1 Drawing Sheet

METHOD AND APPARATUS LOCATING A CABLE IN A PIPE

TECHNICAL FIELD

This invention relates to a technique for ascertaining the relative position of a cable within a pipe.

BACKGROUND ART

Providers of telecommunications service, such as AT&T, often bury their optical fiber cables underground for reasons of safety and esthetics. In many instances, a pipe, usually made from metal such as steel or the like, surrounds and protects the buried optical fiber cable from unstable soil, heavily traveled right-of-ways, and other risks that could aversely affect the cable. Typically, the pipes used for cable burial have a diameter between 3 and 12 inches and a wall thickness of 1/8–1/4 inch to provide a barrier against exposure of the cable. Unfortunately, instances do occur when access to the cable within the pipe becomes necessary, such as during cable repair. Present day methods for gaining access to a buried optical fiber cable within a pipe involves cutting the pipe with a saw or cutting torch, such as the in the case of a metallic pipe. Cutting the pipe in this manner, while effective, often causes damage to the cable itself, requiring the service provider to place the cable out-of-service and re-route traffic in advance of any such cutting rather than risk an accidental service outage.

A technician performing the cutting generally has no knowledge of the exact position of the cable within the pipe. Normally, one would expect that the cable would lie along the bottom of the pipe. However, the optical fiber cable often will twist and turn upon being pulled through the pipe during installation, causing portions of the cable to lie above the pipe bottom. Thus, the technician cutting into the top portion of a cable-containing pipe may inadvertently cut into the optical fiber cable, causing damage that will likely result in a service outage.

Thus, there is a need for a technique for detecting the relative position of a cable within a pipe.

BRIEF SUMMARY OF THE INVENTION

Briefly, in accordance with a preferred embodiment of the invention, a method is provided for locating a cable within a pipe. To locate the cable, a locating signal is applied to a metallic part of the cable for radiation beyond the pipe. The strength of the radiated locating signal is measured at first and second distances from the pipe along a normal perpendicular to the longitudinal axis of the pipe. The difference between the locating signal strengths at the two distances is determined and the relative location of the cable in the pipe is established from the locating signal strength difference.

DETAILED DESCRIPTION

Figure 1:
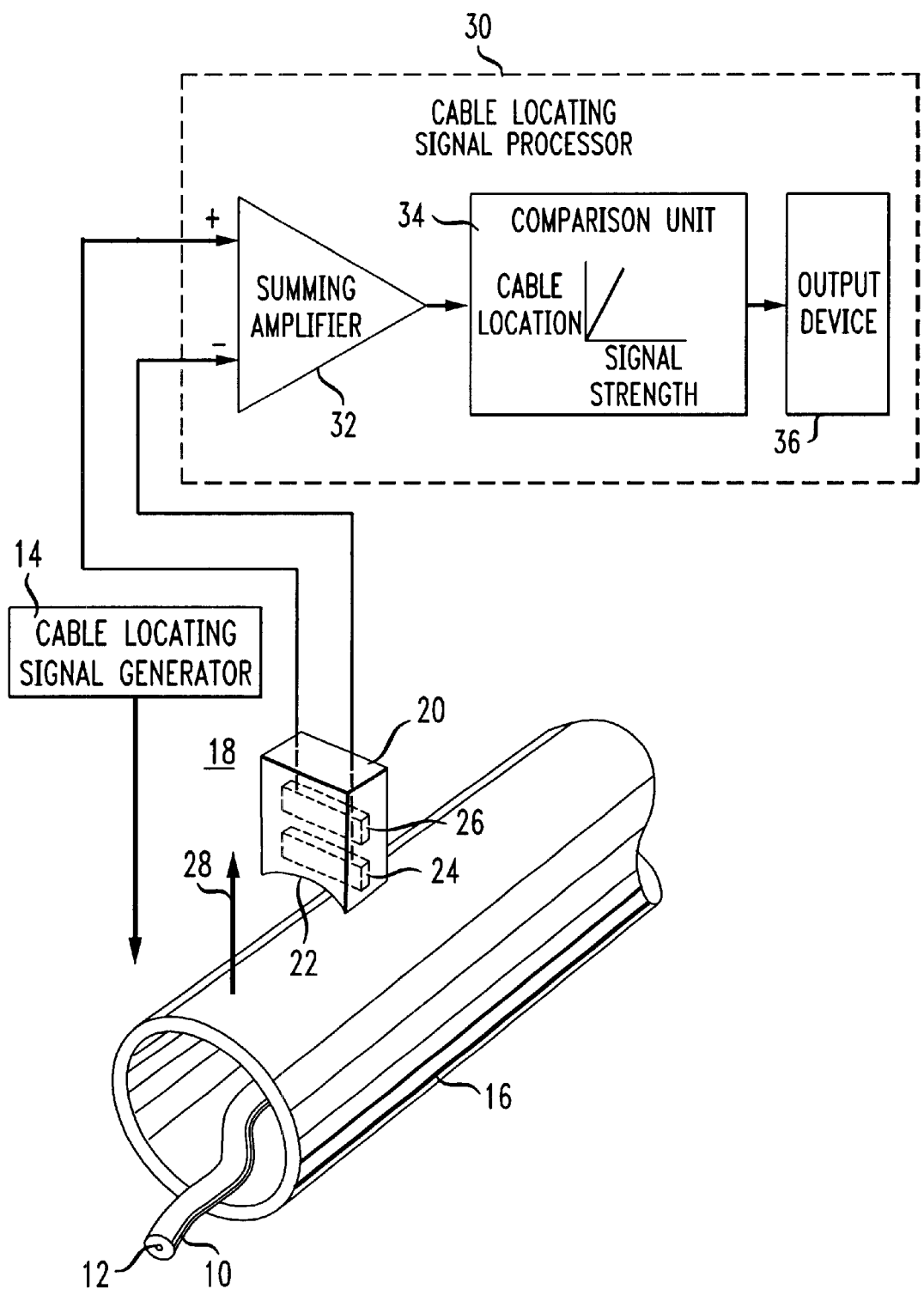
FIG. 1 depicts an apparatus in accordance with the invention for determining the relative location of a cable in a pipe.

FIG. 1 depicts a conventional optical fiber cable 10, such as the type employed by AT&T for carrying telecommunications traffic. The cable 10 has a metallic part 12, either in the form of a metallic sheath or a tracer wire that carries a locating signal applied to the metallic part by a cable signal locating generator 14 of a type well known in the art. Among the manufacturers that manufacture such cable-locating signal generators is Radiodetection Corporation, Mahwah, N.J. By detecting the locating signal radiated by the cable 10, a technician can precisely locate the cable when buried underground.

In many instances, a pipe 16 fabricated from either metal (e.g., steel) or PVC will surround the buried cable 10 to protect the cable from unstable soil, a heavily traveled right-of-way, or other risks. In practice, cable installation underground is accomplished by first burying the pipe 16, either by trenching or by pushing the pipe through the earth. Thereafter, the cable 10 is pulled through the pipe 10. As it is pulled through the pipe 16, the cable 10 will twist and turn, causing portions of the cable to lie above the pipe bottom. Thus, the relative location of the cable 10 within the pipe 16 will vary, and a technician seeking to gain access to the cable will have no advance knowledge of the relative position of the cable in the pipe.

The lack of knowledge regarding the exact location of the cable 10 in the pipe 16 has proven especially problematic if the pipe is made from steel or another hard metal, and a technician must use an acetylene cutting torch or a saw to cut the pipe to access the cable 10. Without accurate knowledge of the relative location of the cable 10 in the pipe 16, the technician may actually cut the cable, causing a service outage.

In accordance with a preferred embodiment of the invention, there is provided a cable locating apparatus 18 for determining the relative location of the cable 10 in the pipe 16. The apparatus 18 includes a detector head 20 having an arcuate bottom portion 22 for mating with a portion of the exterior circumference of the pipe 16. The detector head 20 contains first and second signal detectors 24 and 26 positioned one directly below the other. When the detector head 18 is positioned with its arcuate bottom portion 22 in contact with the pipe 16, the signal detectors 24 and 26 will measure the strength of the locating signal radiated by the cable 10 at known distances along a normal 28 perpendicular to the longitudinal axis of the pipe 16. In practice, the distance between the signal detectors 24 and 26 is known precisely.

The signal detectors 24 and 26 provide their output signals to a cable-locating signal processor 30 for receipt at the invert and non-invert inputs, respectively, of a summing amplifier 32 within the signal processor. The summing amplifier 32 produces an output signal for receipt at a comparison unit 34 in accordance with the difference between locating signal strengths measured by the signal detectors 26 and 24. The comparison unit 34 compares the differential locating signal strength to a predicted signal strength at different locations of the cable 10 within a pipe of known density and diameter. In practice, the differential cable signal strength varies logarithmically with the cable location (i.e., the depth of the cable from the top of the pipe) for a pipe of a given diameter and density.

The comparison unit 34 typically takes the form of digital signal processor that stores or otherwise establishes the relationship between the differential locating cable signal strength and cable location (depth) for pipes of different diameter and densities. When seeking to locate the cable 10 within the pipe 16, the technician 10 typically enters into the comparison unit 34 the associated parameters of the pipe 16 to establish the predicted relationship between differential cable-locating signal strength and cable location. Thereafter, the comparison unit 34 determines the actual cable location in the pipe 16 from a knowledge of the actual cable-locating signal strength using the predicted relationship between cable-locating signal strength and cable location for the particular pipe parameters.

The output signal produced by the comparison unit 34 representing the cable location (depth) in the pipe 16 passes to an output device 36, which may take the form of a meter having a graduated scale that displays the cable depth. Alternatively, the output device 36 may comprise a liquid crystal screen that numerically displays the depth measurement, or alternatively, provides a graphical display showing the relative position of the cable 10 within the pipe 16. The output device could also comprise the combination of a text-to-speech device and an audio reproduction device for aurally announcing the cable depth within the pipe 16. Other types of output devices may be employed for providing human-intelligible information indicative of the cable location in the pipe 16.

The foregoing describes an apparatus 18, and its method of use, for ascertaining the relative position of a cable 10 within a pipe 16.

The above-described embodiments merely illustrate the principles of the invention. Those skilled in the art may make various modifications and changes that will embody the principles of the invention and fall within the spirit and scope thereof.

What is claimed is:

1. A method for locating a cable within a pipe relative to a normal parallel to a pipe radius and perpendicular to the pipe longitudinal axis, comprising the steps of:

applying a locating signal to the cable to cause the cable to radiate the locating signal beyond the pipe;

detecting the locating signal strength at a first prescribed distance from the pipe, as measured along the normal;

detecting the locating signal strength at a second prescribed distance from the pipe, as measured along the normal;

establishing a differential locating signal strength in accordance with a difference between the locating signal strengths measured at the first and second distances; and determining the relative position of the cable in the pipe in accordance with the differential locating signal strength.

2. The method according to claim 1 wherein the determining step comprises the step of comparing the differential locating signal strength to a predicted locating signal strength at different locations of the cable within a pipe of known density and diameter.

3. The method according to claim 2 wherein the predicted locating signal strength varies logarithmically with the cable position in the pipe.

4. The method according to claim 1 further including the step of providing a visual indication of the relative location of the cable in the pipe.

5. The method according to claim 1 further including the step of providing an aural indication of the relative location of the cable in the pipe.

6. Apparatus for locating a cable within a pipe relative to a normal parallel to a pipe radius and perpendicular to the pipe longitudinal axis, comprising the steps of:

a cable-locating signal generator for applying a locating signal to the cable to cause the cable to radiate the locating signal beyond the pipe;

a detector head having first and second detectors for detecting the locating signal strength at first and second prescribed distances from the pipe, as measured along the normal; and a cable locating signal processor for establishing a differential locating signal strength in accordance with a difference between the locating signal strengths measured at the first and second distances and for determining the relative position of the cable in the pipe in accordance with the differential locating signal strength.

7. The apparatus according to claim 6 wherein the cable locating signal processor comprises:

a summing amplifier having an invert and non-invert inputs supplied with the output signal of the first and second detectors, respectively, for yielding a differential locating signal strength in accordance with the difference between the locating signal strengths measured by the first and second detectors, a comparison unit for producing an output signal indicative of the cable location in the pipe by comparing the differential cable-locating signal strength to a predicted cable-locating signal strength relationship for a particular pipe having prescribed characteristics; and an output device for providing an indication of the relative cable location in accordance with the comparison unit output signal.

8. The apparatus according to claim 7 wherein the output device comprises a meter having a graduated scale that displays the cable depth.

9. The apparatus according to claim 7 wherein the output device comprises a liquid crystal screen that numerically displays the depth measurement.

10. The apparatus according to claim 7 wherein the output device comprises a liquid crystal screen that provides a graphical display showing the relative position of the cable within the pipe.

11. The apparatus according to claim 7 wherein the output device comprises the combination of a text-to-speech device and an audio reproduction device for aurally announcing the cable location within the pipe.

* * * * *